United States Patent
Esselborn et al.

(10) Patent No.: US 7,179,877 B2
(45) Date of Patent: Feb. 20, 2007

(54) INNOVATIVE POLYESTERSILOXANE ACRYLATES, THEIR USE AS ADDITIVES IN RADIATION-CURABLE COATINGS AND PRINTING INKS, AND PROCESSES FOR PREPARING THEM

(75) Inventors: Eberhard Esselborn, Essen (DE); Sascha Oestreich, Essen (DE); Cornelia Schröter, Krefeld (DE)

(73) Assignee: Goldschmidt GmbH, Essen (DE)

( * ) Notice: Subject to any disclaimer, the term of this patent is extended or adjusted under 35 U.S.C. 154(b) by 481 days.

(21) Appl. No.: 10/825,945

(22) Filed: Apr. 16, 2004

(65) Prior Publication Data
US 2004/0210020 A1    Oct. 21, 2004

(30) Foreign Application Priority Data
Apr. 19, 2003   (DE) ................. 103 18 017

(51) Int. Cl.
*C08G 77/24* (2006.01)
(52) U.S. Cl. ................. 528/26; 528/28; 526/279; 526/302; 526/301
(58) Field of Classification Search ........... 528/26, 528/28; 526/279, 301, 302
See application file for complete search history.

(56) References Cited

U.S. PATENT DOCUMENTS 4,130,708 A * 12/1978 Friedlander et al. .......... 528/28
4,188,472 A * 2/1980 Chang .......................... 528/75
4,246,391 A * 1/1981 Watson, Jr. ................... 528/49
4,561,950 A * 12/1985 Leo .............................. 522/91
5,780,530 A * 7/1998 Mizutani et al. ............ 523/209
6,524,564 B1 * 2/2003 Kim et al. ................ 424/70.12
6,767,987 B2 * 7/2004 Okazaki ...................... 528/310

FOREIGN PATENT DOCUMENTS

| EP | 0 493 172 A1 | 7/1992 |
| EP | 0 937 998 A2 | 8/1999 |
| WO | WO 98/03574 | 1/1998 |
| WO | WO 00/12588 | 3/2000 |

OTHER PUBLICATIONS

Yu et al., "Properties of Ultraviolet Cured Polydiemethylsiloxane-Urea Acrylates", Journal of Applied Polymer Science, vol. 30, No. 4, Apr. 1985.

* cited by examiner

*Primary Examiner*—Margaret G. Moore
(74) *Attorney, Agent, or Firm*—Frommer Lawrence & Haug LLP

(57) ABSTRACT

Innovative polyestersiloxane acrylates obtainable by reacting one or more organically modified polysiloxanes with one or more polyisocyanates having in each case at least two isocyanate groups and one or more polyester acrylates or polyester methacrylates and their use as additives in radiation-curable coatings and printing inks for improving the resistance of the coating toward soiling of all kinds.

11 Claims, No Drawings

INNOVATIVE POLYESTERSILOXANE ACRYLATES, THEIR USE AS ADDITIVES IN RADIATION-CURABLE COATINGS AND PRINTING INKS, AND PROCESSES FOR PREPARING THEM

RELATED APPLICATIONS

This application claims priority to German application Serial No. 103 18 017.6, filed Apr. 19, 2003, herein incorporated by reference.

BACKGROUND OF THE INVENTION

1. Field of the Invention

The invention relates to innovative polyestersiloxane acrylates, to their use as additives in radiation-curable coatings and printing inks, and to processes for preparing them.

The innovative polyestersiloxane acrylates display outstanding properties as additives in radiation-curing coatings, printing inks and/or print varnishes. The innovative polyestersiloxane acrylates are highly compatible with liquid coatings, printing inks and/or print vanishes, possess polymerizable groups, thereby minimizing the risk of migration of constituents of additives, and promote the leveling and the wetting properties of the still-liquid coatings, printing inks and/or print varnishes. The cured coatings, printing inks and/or print varnishes exhibit improved resistance to soiling by felt tip pens ("marker resistance"), without the slip properties of the cured coating being made unsatisfactory.

2. Description of the Related Art

Radiation curing by UV light or electron beams is a rapid, efficient, and environmentally benign way to cure polymerizable monomers or oligomers. Absence of emissions, low investment costs, and low energy requirement as a result of short drying units, high production rates by virtue of rapid curing, and, in many cases, enhanced quality of the coating, especially with regard to gloss and abrasion resistance, are reasons why, in the field of industrial coatings, radiation curing constitutes the application form which is showing the greatest expansion.

Radiation-curing coatings, printing inks and/or print varnishes are known and are described in, for example, "UV & EB Curing Formulations for Printing Inks, Coatings & Paints" (R Holman, P. Oldring, London 1988).

There is a growing demand for additives for coatings and print varnishes which raise the resistance of the coating to soiling of all kinds. Soiling as a result of felttip pens is particularly unwanted ("marker resistance", "antigraffiti effect"). The harm caused by marker pen contamination on furniture, floors, walls, and other surfaces is immense.

In order to increase the marker resistance, as it is known, of radiation-curable coatings and print varnishes it is nowadays customary to use fluorine compounds and/or silicone polymers (EP-A-0 493 172, WO-A-98/03574).

A drawback of these fluorine and/or silicone compounds, however, is that they have to be used in relatively large amounts in order to obtain a sufficient protective effect (comonomers, copolymers).

Because they often do not react with the binder during the process of curing, the additives may migrate from the cured coating and/or print varnish and be manifested as a disruptive film on the surface.

The fluorine and/or silicone compounds are often very incompatible with the coating and/or print varnish, with the possible consequence of clouding and surface defects (craters, orange peel, dimples) in the coating.

Furthermore, such additives significantly lower the friction coefficient of the coating, producing slippery surfaces. In the field of floor coating in particular (woodblock flooring, linoleum, PVC) such an effect is undesirable, since the floor coating must be secure underfoot. The friction coefficient of the coating must therefore exceed a certain minimum.

Accordingly there is a growing demand for additives for radiation-curable coatings and/or print varnishes which contain radiation-curable groups, are highly compatible, improve the marker resistance of coatings and/or print varnishes, and do not render the slip properties of the coating unsatisfactory.

OBJECTS OF THE INVENTION

It is an object of the present invention, therefore, to provide additives which contain radiation-curable groups, are highly compatible, improve the marker resistance of coatings and/or print varnishes, and do not render the slip properties of the coating unsatisfactory. This and other objects are apparent from the Description of the Invention.

DESCRIPTION OF THE INVENTION

Reaction products of organically modified polysiloxanes with isocyanates and acrylates are known and have been described in the literature. For example, WO-A-00/12588 describes, among other things, the use of such polymers in hair cosmetology. EP-A-0 937 998 describes the use of polysiloxanes led via a urethane group to polymerizable groups in contact lens materials.

The properties of pure, UV-cured polydimethylsiloxane-urea acrylates are described by X. Yu et al., Journal of Applied Polymer Science, Vol. 30, 2115–2135 (1985).

The literature cited does not describe the use of reaction products of organically modified polysiloxanes with isocyanates and acrylates as additives in radiation-curing coatings, printing inks and/or print varnishes. Nor does it mention reaction products of organically modified polysiloxanes with isocyanates and polyester acrylates to form polyestersiloxane acrylates.

Surprisingly it has now been found that the aforementioned object is achieved by innovative polyestersiloxane acrylates obtainable by reacting one or more organically modified polysiloxanes with one or more polyisocyanates having in each case at least two isocyanate groups and one or more polyester acrylates or polyester methacrylates.

The invention accordingly first provides polyestersiloxane acrylates obtainable by reacting I.) one or more organically modified polysiloxanes of the general formula (I)

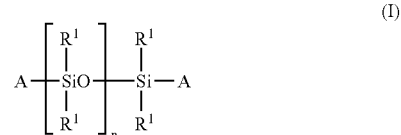

where the radicals $R^1$ in the molecule are identical or different and are alkyl radicals, preferably having 1 to 4 carbon atoms, A are identical or different and are —$R^2$—X where $R^2$ is a radical of the general formula (Ia)

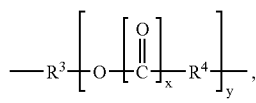

(Ia)

$R^3$ is a divalent optionally substituted alkyl or alkenyl radical, preferably having 2 to 11 carbon atoms,
$R^4$ radicals are identical to or different from one another and are divalent, optionally substituted alkyl or aralkyl radicals,
x independently at each occurrence is 0 or 1,
y independently at each occurrence has a value from 0 to 100, and
X is an isocyanate-reactive group, and II.) one or more polyisocyanates having in each case at least two isocyanate groups, and III.) one or more polyester acrylates or polyester methacrylates of the general formula (II)

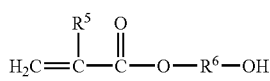

(II)

in which
$R^5$ is a hydrogen atom or a methyl group and
$R^6$ is a radical of the general formula (IIa)

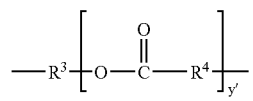

(IIa)

where
$R^3$ and $R^4$ are as defined above and
y' has a value from 1 to 50, optionally in the presence of inhibitors, catalysts, and optionally further compounds reactive with isocyanate groups.

The invention further provides a process for preparing the innovative polyestersiloxane acrylates, which first involves, in a first stage ($S_1$)

a) reacting one or more organically modified polysiloxanes of the general formula (I)

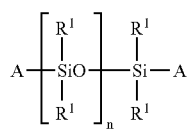

(I)

in which the radicals
A and $R^1$ are as defined above with b) one or more polyisocyanates having in each case at least two isocyanate groups, optionally in the presence of inhibitors and catalysts, to form a prepolymer containing isocyanate groups, and subsequently in a second stage ($S_2$) reacting said prepolymer with one or more polyester acrylates or polyester methacrylates of the general formula (II)

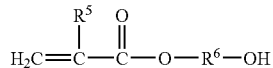

(II)

in which the radicals
$R^5$ and $R^6$ are as defined above and
optionally in a further stage ($S_3$) with preferably monofunctional compounds containing isocyanate-reactive groups by processes which are known per se.

The invention additionally provides polyestersiloxane acrylates obtainable by reacting one or more organically modified polysiloxanes of the general formula (I) with one or more polyisocyanates having in each case at least two isocyanate groups in a molar ratio of from about 1:1.60 to about 1:1.95, and essentially equivalent amounts (based on OH groups of the compounds of the general formula (II) and isocyanate groups of the prepolymer formed from compounds of the general formula (I) and isocyanates) of one or more polyester acrylates or polyester metacylates of the general formula (II) optionally in the presence of inhibitors, catalysts, and optionally further compounds reactive with isocyanate groups.

Examples of the radical $R^1$ are alkyl radicals having 1 to 4 carbon atoms, such as methyl, ethyl, propyl and/or butyl radicals. Methyl radicals are particularly preferred.

Examples of the radical $R^3$ are divalent, optionally substituted alkyl or alkenyl radicals having 2 to 11 carbon atoms, such as —$CH_2CH_2$—, —$CH_2CH(CH_3)$—, —$CH_2CH_2CH_2$—, —$(CH_2)_6$—, —$(CH_2)_8$—, and —$CH_2CH_2CH(CH_3)$—.

Examples of the radical $R^4$ are divalent, optionally substituted alkyl or aralkyl radicals having 2 to 11 carbon atoms, such as —$CH_2CH_2$—, —$CH_2CH(CH_3)$—, —$CH_2CH_2CH_2$—, —$(CH_2)_5$—, —$(CH_2)_6$—, —$(CH_2)_8$—, —$CH_2CH_2CH(CH_3)$—, —$CH_2CH(CH_2CH_3)$—, and

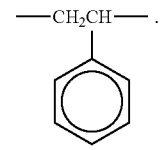

Examples of X are isocyanate-reactive groups, such as hydroxyl, primary amino, and secondary amino groups, for example.

Examples of organically modified polysiloxanes of the general formula (I) are □□-hydroxy-functional polysiloxanes, α,ω-amino-functional polysiloxanes, αω-polyether-functional poly-siloxanes, and α,ω-polyester-functional polysiloxanes, as obtainable, for example, under the trade names Tegomer® and Tegopren® from Goldscimidt AG.

Polyisocyanates in the sense of the present invention possess at least two isocyanate groups per molecule. Examples of polyisocyanates are, in particular, diisocyanates and triiocyanates Suitable diisocyanates include, for example, tolylene diisocyanate (IDI), hexamethylene diisocyanate (HMDI), isophorone diisocyanate (IPDI), diphenylmethane diisocyanate (MDI), and tetramethylxylene diisocyanate (TMXDI). Also available are oligomers of some of these products, for example those of HMDI (trimer) and IPDI (trimer). Polyisocyanates of this kind are available, for example, under the trade names Desmodur® N 3300 from Bayer AG and Vestanat® T1890/100 from Degussa AG.

Examples of polyester acrylates or polyester methacrylates of the general formula (II) are compounds such as those available from Daicel Chemical Industries under the trade names Placcel® FA and Placcel® FM, respectively.

Inhibitors in the sense of the present invention include, in particular, stabilizers for (meth)acrylic acid or (meth)acrylic esters. Examples of suitable stabilizers include hydroquinone monomethyl ethers, optionally also hydroquinone and/or phenothiazine, which can be used in amounts customary for stabilizing (meth)acrylic acid or (meth)acrylic ester.

Catalysts in the sense of the present invention include, in particular, metal compounds which accelerate the reaction of the isocyanate groups. Suitable catalysts are available, for example, under the trade name Kosmos® from Goldschmidt AG.

In one preferred embodiment of the present invention in the innovative polyestersiloxane acrylates

| | |
|---|---|
| n | is from 5 to 100, in particular from 10 to 50, |
| x | is 0 or 1, |
| y | is from 0 to 20, in particular from 0 to 10, and |
| y' | is from 1 to 20, in particular from 2 to 10. |

The innovative polyestersiloxane acrylates of the invention may be present advantageously in radiation-curing coatings, printing inks and/or print varnishes in a concentration of from about 0.01 to about 10.0% by weight, preferably from about 0.5 to about 2% by weight.

Where appropriate they can be used in a mixture with radiation-curable compounds, such as acrylates and methacrylates, for example, as additives in radiation-curing coatings, printing inks and/or print varnishes.

The following non-limiting examples illustrate the invention:

General Preparation Instructions:

The preparation of an innovative polyestersiloxane acrylate of the invention is described below.

A dry three-necked flask equipped with a stirrer, intensive condenser, thermometer, and dropping funnel is charged with the polyisocyanate, a suitable inert solvent, and an effective amount of the inhibitor. With stirring, the mixture is heated at from 80 to 100° C. and an effective amount of a catalyst is added.

Thereafter the organically modified polysiloxane is slowly added dropwise. There is a slightly exothermic reaction. After the isocyanate content has fallen to the anticipated level a substantially equivalent amount (from 0.8 to 1.2), based on the residual isocyanate content, of a polyester acrylate is added. The reaction mixture is heated at reflux until isocyanate conversion is complete. The remaining, residual isocyanate content can where appropriate be reduced with further low molecular mass compounds reactive with isocyanate groups.

EXAMPLES

The invention is illustrated below with reference to the following non-limiting examples. The aforementioned general preparation instructions are used to prepare the following compounds 1 to 5 of the invention (table 1):

TABLE 1

| Compound | Polyisocyanate | Polysiloxane | Polyester acrylate about 1 eq. to residual NCO content |
|---|---|---|---|
| 1 | 2 mol Desmodur® N 3300 (Bayer AG; oligoisocyanate) | 1 mol Tegomer® H-Si 2111 (Goldschmidt AG; □□-hydroxy-functional polysiloxane, M about 1000) | Placcel® FA 6 (Daicel Chemical Industries) |
| 2 | 2 mol Vestanat® T1890/100 (Degussa AG; oligoisocyanate) | 1 mol Tegomer® H-Si 2311 (Goldschmidt AG; α,ω-hydroxy-functional polysiloxane, M about 3000) | Placcel® FM 5 (Daicel Chemical Industries) |
| 3 | 2 mol Vestanat T1890/100 (Degussa AG; oligoisocyanate) | 1 mol Tegomer® A-Si 2322 (Goldschmidt AG; α,ω-amino-functional polysiloxane, M ca. 3000) | Placcel® FA 6 (Daicel Chemical Industries) |
| 4 | 1.8 mol Vestanat® T1890/100 (Degussa AG; oligoisocyanate) | 1 mol Tegopren® 5845 (Goldschmidt AG; α,ω-polyether-functional polysiloxane, M about 3000) | Placcel® FA 2 (Daicel Chemical Industries) |
| 5 | 1.8 mol Vestanat® T1890/100 (Degussa AG; oligoisocyanate) | 1 mol Tegomer® H-Si 2311 (Goldschmidt AG; | Placcel® FA 6 (Daicel Chemical Industries) |

TABLE 1-continued

| Compound | Polyisocyanate | Polysiloxane | Polyester acrylate about 1 eq. to residual NCO content |
|---|---|---|---|
| | | α,ω-hydroxy-functional polysiloxane, M about 3000) | |

The skilled worker is well aware that the abovementioned compounds are in the form of mixtures. The average molecular weights of the compounds stated were calculated from the isocyanate values and the hydroxyl and/or amine numbers.

For the purpose of comparison the following, noninventive compounds were selected:

Comparative 1:

A commercial siloxane acrylate available under the trade name Tego® Rad 2700 from Tego Chemie Service GmbH.

Comparative 2:

A commercial polyestersiloxane available under the trade name Tego® Glide 422 from Tego Chemie Service GmbH.

Comparative 3:

A commercial polyethersiloxane available under the trade name Tego® Glide 440 from Tego Chemie Service GmbH.

Test Formula:

As a UV-curable test coating material the following formula was selected (table 2):

TABLE 2

| Raw material | % |
|---|---|
| Ebecryl® 608 (UCB Chemicals; epoxy acrylate) | 44.5 |
| Laromer® TPGDA (BASF AG; tripropylene glycol diacrylate) | 45.5 |
| Benzophenone | 5 |
| Ebecryl® P 115 (UCB Chemicals; amino-functional acrylate) | 5 |

The UV-curable test coating material is formulated conventionally in accordance with the above formula. The last ingredient added in each case is 0.5% (active substance content) of the silicone additive.

In order to determine the performance properties of the cured coatings the formulations are applied in a wet film thickness of 50 μm using a spiral doctor blade to PVC floor covering sections cleaned beforehand by isopropanol. Curing is effected by exposure to UV light at 120 W/cm with a belt speed of 10 m/min. This operation is repeated twice in each case.

In order to evaluate the marker resistance a selection of different commercial felttip pens (test markers, e.g., Edding® 3000) are used to simulate writing. An evaluation is made of the visual appearance of the resulting test mark. If the marker resistance is very good the test mark will contract on the surface of the coating and hence only cover relatively small areas which can be removed easily, with the assistance where appropriate of solvents or cleaners. Assessment is made on a scale from 1 to 4, in which 1 describes a film having outstanding marker resistance and 4 a film having poor marker resistance.

Thereafter a visual assessment is made of the leveling, cratering tendency, and clouding of the coating. Assessment is on a scale from 1 to 4, in which 1 describes a defect-free film while 4 indicates severe film defects (craters, dimples, clouding, orange peel, etc.).

The friction coefficient of the cured coating is determined using a specially converted electrically driven film applicator with a constant rate of advance. The inserted doctor blade is replaced on the movable blade mount by a plate which lies on rollers at the other end of the applicator. By means of the blade mount it is possible to move the plate, to which the coated substrate is fixed. In order to determine the friction coefficient a weight (200 g) with a flat felt underlay is placed on the coated sheet. The coated sheet on the plate is pulled away beneath the plate at a speed of 11 mm/s. The vertical force required to do this is measured using a force transducer and reported as the friction coefficient.

TABLE 3

| | Marker resistance | Leveling | Clouding | Friction coefficient (cN) |
|---|---|---|---|---|
| No additive | 5 | 1 | clear | 443 |
| Compound 1 | 2–3 | 2 | clear | 317 |
| Compound 2 | 1–2 | 2 | clear | 221 |
| Compound 3 | 1–2 | 1 | clear | 234 |
| Compound 4 | 2–3 | 1 | clear | 256 |
| Compound 5 | 1 | 1 | clear | 238 |
| Comparative 1 | 1–2 | 5 | very cloudy | 71 |
| Comparative 2 | 4 | 2 | slightly cloudy | 125 |
| Comparative 3 | 4–5 | 2 | clear | 65 |

As is evident from table 3 above the polyestersiloxane acrylates of the invention are distinguished by an optimum marker resistance, with the further performance properties (leveling, clouding, friction coefficient) remaining at an unexpectedly high level.

As compared with the noninventive siloxane compounds the friction coefficients in particular of the polyestersiloxane acrylates of the invention remain at an acceptably high level (>200 cN).

The above description of the invention is intended to be illustrative and not limiting. Various changes or modifications in the embodiments described herein may occur to those skilled in the art. These changes can be made without departing from the scope or spirit of the invention.

What is claimed is:

1. A polyestersiloxane acrylate obtained by reacting

I.) one or more organically modified polysiloxanes of the formula (I)

$$A-\left[\begin{array}{c}R^1\\|\\SiO\\|\\R^1\end{array}\right]_n\begin{array}{c}R^1\\|\\Si-A\\|\\R^1\end{array} \quad (I)$$

where the radicals
$R^1$ in the molecule are identical or different and are alkyl radicals,
A are identical or different and are $-R^2-X$, where $R^2$ is a radical of the general formula (Ia)

$$-R^3 + O + \begin{bmatrix} O \\ \| \\ C \end{bmatrix}_x R^4 \Big]_y, \quad (Ia)$$

$R^3$ is a divalent, optionally substituted alkyl or alkenyl radical,
$R^4$ radicals are identical to or different from one another and are divalent, optionally substituted alkyl or aralkyl radicals,
x independently at each occurrence is 0 or 1,
y independently at each occurrence has a value from 0 to 100, and
X is an isocyanate-reactive group, and II.) one or more polyisocyanates having in each case at least two isocyanate groups, and III.) one or more polyester acrylates or polyester methacrylates of the general formula (II)

$$H_2C=\overset{R^5}{\underset{|}{C}}-\overset{O}{\underset{\|}{C}}-O-R^6-OH \quad (II)$$

in which
$R^5$ is a hydrogen atom or a methyl group and
$R^6$ is a radical of the general formula (IIa)

$$-R^3 + O - \overset{O}{\underset{\|}{C}} - R^4 \Big]_{y'} \quad (IIa)$$

where
$R^3$ and $R^4$ are as defined above and
y' has a value from 1 to 50,
optionally in the presence of inhibitors, catalysts, additional compounds containing isocyanate-reactive groups.

2. A polyestersiloxane acrylate as claimed in claim 1, obtained by reacting one or more organically modified polysiloxanes of the formula (I) with one or more polyisocyanates having in each case at least two isocyanate groups in a molar ratio of from about 1:1.60 to about 1:1.95, and essentially equivalent amounts (based on OH groups of the compounds of the formula (II) and isocyanate groups of the prepolymer formed from compounds of the formula (I) and isocyanates) of one or more polyester acrylates or polyester methacrylates of the formula (II), optionally in the presence of inhibitors, catalysts, and additional compounds containing isocyanate-reactive groups.

3. The polyestersiloxane acrylate according to claim 2 wherein the additional compounds containing isocyanate reaction groups are present and the compounds are monofunctional-containing isocyanates.

4. The polyestersiloxane acrylate according the claim 1, wherein $R^1$ is an identical or different alkyl radical having 1 to 4 carbon atoms and $R^3$ is an optionally substituted alkyl or alkenyl radical having 2 to 11 carbon atoms.

5. The polyestersiloxane acrylate as claimed in claim 1, wherein in compounds of formula (I) $R^3$ independently at each occurrence is selected from the group consisting of $-CH_2CH_2-$, $-CH_2CH(CH_3)-$, $-CH_2CH_2CH_2-$, $-(CH_2)_6-$, $-(CH_2)_8-$, and $-CH_2CH_2CH(CH_3)-$ and $R^4$ independently at each occurrence is selected from the group consisting of $-CH_2CH_2-$, $-CH_2CH(CH_3)-$, $-CH_2CH_2CH_2-$, $-(CH_2)_5-$, $-(CH_2)_6-$, $-(CH_2)_8-$, $-CH_2CH_2CH(CH_3)-$, $-CH_2CH(CH_2CH_3)-$, and $$-CH_2CH- \underset{\bigcirc}{|}\;.$$

6. The polyestersiloxane acrylate as claimed in claim 1, wherein in compounds of formula (I)
n is from 5 to 100,
x is 0 or 1, and
y is from 0 to 20.

7. The polyestersiloxane acrylate as claimed in claim 1, wherein in compounds of formula (IIa) y' is from 1 to 20.

8. The polyestersiloxane acrylate as claimed in claim 1, the polyisocyanates are tolylene diisocyanate, hexamethylene diisocyanate, isophorone diisocyanate, diphenylmethane diisocyanate, tetramethylxylene diisocyanate or oligomers thereof.

9. A process for preparing a polyestersiloxane acrylate as claimed in claim 1, which comprises, in a first stage ($S_1$)
a) reacting one or more organically modified polysiloxanes of the general formula (I)

$$A-\left[\begin{array}{c}R^1\\|\\SiO\\|\\R^1\end{array}\right]_n\begin{array}{c}R^1\\|\\Si-A\\|\\R^1\end{array} \quad (I)$$

in which the radicals
A and $R^1$ are as defined above with
b) one or more polyisocyanates having in each case at least two isocyanate groups, optionally in the presence of inhibitors and catalysts, to form a prepolymer containing isocyanate groups;
subsequently in a second stage ($S_2$) reacting said prepolymer with one or more polyester acrylates or polyester methacrylates of formula (II)

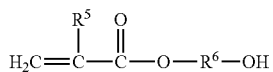 (II)

in which the radicals $R^5$ and $R^6$ are as defined above; and optionally in a third stage ($S_3$) reacting the product found with compounds containing isocyanate-reactive groups.

10. A radiation-curing coating comprising a radiation-curable compound and a polyestersiloxane acrylate according to claim 1.

11. A radiation-curing coating, printing ink and/or varnish comprising as additives from about 0.01 to about 10% by weight, based on the radiation-curing coating, ink or varnish, of one or more compounds as claimed in claim 1.

* * * * *